US008185518B2

(12) United States Patent
Bloom et al.

(10) Patent No.: US 8,185,518 B2
(45) Date of Patent: May 22, 2012

(54) METHOD, SYSTEM AND PROGRAM PRODUCT FOR REWRITING STRUCTURED QUERY LANGUAGE (SQL) STATEMENTS

(75) Inventors: Howard S. Bloom, Poughkeepsie, NY (US); Roy Froehlich, North York (CA); Thomas A. Jobson, Jr., New Paltz, NY (US); Edith A. Kanyock, Sloatsburg, NY (US); Charles F. Matula, Poughkeepsie, NY (US); Arnold M. Rosenberg, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 2226 days.

(21) Appl. No.: 10/987,346

(22) Filed: Nov. 12, 2004

(65) Prior Publication Data

US 2006/0106766 A1     May 18, 2006

(51) Int. Cl.
*G06F 7/00* (2006.01)
*G06F 17/30* (2006.01)
(52) U.S. Cl. ........................................ 707/714; 707/737
(58) Field of Classification Search .................. 707/714, 707/737
See application file for complete search history.

(56) References Cited

U.S. PATENT DOCUMENTS

| | | | | |
|---|---|---|---|---|
| 5,276,870 | A | * | 1/1994 | Shan et al. ........................ 707/2 |
| 5,544,355 | A | | 8/1996 | Chaudhuri et al. |
| 5,864,842 | A | * | 1/1999 | Pederson et al. .................. 707/3 |
| 6,513,034 | B1 | | 1/2003 | Leung et al. |
| 6,560,594 | B2 | | 5/2003 | Cochrane et al. |
| 6,574,623 | B1 | | 6/2003 | Leung et al. |
| 7,107,282 | B1 | * | 9/2006 | Yalamanchi .................. 707/102 |
| 7,127,467 | B2 | * | 10/2006 | Yalamanchi et al. ......... 707/102 |

OTHER PUBLICATIONS

Lacroix, Zoe. Object Views through Search Views of Web Datasources, 1999, Springer-Verlag.*
INSPEC, AN 6225516, "Integrating SQL Databases with Content-Specific Search Engines", Dessloch et al., 1997.
INSPEC, AN 5245149, "Maximizing Your Warehouse", Raden, 1996.
INSPEC, AN 7756060, "Automated EJB Client Code Generation Using Database Query Rewriting", Jianguo et al., 2003.
INSPEC, AN 7269044, "External SQL Rewriters", To et al., 2002.
Dessloch et al., "Integrating SQL Databases with Content-Specific Search Engines", pp. 528-537, Proceedings of the Twenty-third International Conference on Very Large Data Bases, Aug. 26-29, 1997.

* cited by examiner

*Primary Examiner* — John R. Cottingham
*Assistant Examiner* — Mariela Reyes
(74) *Attorney, Agent, or Firm* — Schmeiser, Olsen & Watts; Arthur Samodovitz

(57) ABSTRACT

Under the present invention, a SQL statement having search criteria is received. Upon receipt, a table that lists all possible combinations of the search criteria is created. From the table, a set of patterns among the possible combinations is identified. Based on these patterns, the table is then sorted. Once sorted, the table is divided into a set of temporary tables based on the set of patterns/sorting operation. The set of temporary tables are then individually joined with the SQL statement and separate searches are conducted. A new set of temporary tables is then generated and populated with results of the separate searches. These result tables are then unioned/combined into a single result table.

24 Claims, 2 Drawing Sheets

METHOD, SYSTEM AND PROGRAM PRODUCT FOR REWRITING STRUCTURED QUERY LANGUAGE (SQL) STATEMENTS

BACKGROUND OF THE INVENTION

1. Field of the Invention

The present invention generally relates to SQL statements. Specifically, the present invention relates to a method, system and program product for rewriting SQL statements.

2. Related Art

Structured query language (SQL) is a standard interactive and programming language for getting information to and from a database. Although SQL is both an ANSI and an ISO standard, many database products support SQL with proprietary extensions to the standard language. Queries take the form of a command language that allows a user to select, insert, update and find the location of data. In a typical implementation, a user will assemble and submit an SQL statement that specifies search criteria. In general, the search criteria includes "search objects" and "search expressions" (e.g., Boolean expressions). For example, if a user wishes to locate all purchase orders within a database having the country code "DE" (e.g., for Germany), OR having one or the customers numbers "001," "002" or "003," the country code and the customer numbers would represent the "search objects" portion of the search criteria, while the OR would represent the "search expression" portion. As such, the user can assemble a SQL statement such as the following:

```
SELECT O.customer_po_num
FROM bse_order O INNER JOIN cust_order C ON (O.ID =
c.order_id and c.order_cust_type = 'SOLD_TO')
WHERE (O.ISO_COUNTRY_CODE IN ('DE') OR
(C.CUSTOMER_NUM IN
('001','002','003')
```

Unfortunately, the presence of search expressions such as OR and AND in a SQL statement, cause the query to be extremely slow. This is especially the case as SQL statements become more complex. Heretofore, no approach has alleviated this burden. That is, no existing approach has been able to transform or rewrite SQL statements into more manageable units of work. In view of the foregoing, there exists a need for a method, system and program product for rewriting SQL statements. Specifically, a need exists whereby the search criteria can be separated into smaller units of work or indices that are used to conduct separate, faster searches.

SUMMARY OF THE INVENTION

In general, the present invention provides a method, system and program product for rewriting SQL statements. Under the present invention, a SQL statement having search criteria is received. Upon receipt, a table that lists all possible combinations of the search criteria is created. From the table, a set of patterns among the possible combinations is identified. Based on these patterns, the table is then sorted. Once sorted, the table is divided into a set of temporary tables based on the set of patterns/sorting operation. The set of temporary tables are then individually joined with the SQL statement and separate searches are conducted. A new set of temporary tables is then generated and populated with results of the separate searches. These result tables are then unioned/combined into a single result table.

A first aspect of the present invention provides a method for rewriting Structured Query Language (SQL) statements, comprising: receiving a SQL statement having search criteria; creating a table that lists all possible combinations of the search criteria; identifying a set of patterns among the all possible combinations, and sorting the table based on the set of patterns; dividing the table into a set of temporary tables based on the sorting; joining the set of temporary tables with the SQL statement, and generating a new set of temporary tables that contain results of searches conducted using the SQL statement as joined with the set of temporary tables; and combining the new set of temporary tables into a single result table.

A second aspect of the present invention provides a system for rewriting Structured Query Language (SQL) statements, comprising: a system for receiving a SQL statement having search criteria; a system for creating a table that lists all possible combinations of the search criteria; a system for identifying a set of patterns among the all possible combinations, and sorting the table based on the set of patterns; a system for dividing the table into a set of temporary tables based on the set of patterns; a system for joining the set of temporary tables with the SQL statement, and for generating a new set of temporary tables that contain results of searches conducted with the SQL statement as joined with the set of temporary tables; and a system for combining the new set of temporary tables into a single result table.

A third aspect of the present invention provides a program product stored on a recordable medium for rewriting Structured Query Language (SQL) statements, which when executed, comprises: program code for receiving a SQL statement having search criteria; program code for creating a table that lists all possible combinations of the search criteria; program code for identifying a set of patterns among the all possible combinations, and sorting the table based on the set of patterns; program code for dividing the table into a set of temporary tables based on the set of patterns; program code for joining the set of temporary tables with the SQL statement, and for generating a new set of temporary tables that contain results of searches conducted with the SQL statement as joined with the set of temporary tables; and program code for combining the new set of temporary tables into a single result table.

A fourth aspect of the present invention provides a method for deploying an application for rewriting Structured Query Language (SQL) statements, comprising: providing a computer infrastructure being operable to: receive a SQL statement having search criteria; create a table that lists all possible combinations of the search criteria; identify a set of patterns among the all possible combinations, and sort the table based on the set of patterns; divide the table into a set of temporary tables based on the set of patterns; join the set of temporary tables with the SQL statement, and generate a new set of temporary tables that contain results of searches conducted with the SQL statement as joined with the set of temporary tables; and combine the new set of temporary tables into a single result table.

A fifth aspect of the present invention provides computer software embodied in a propagated signal for rewriting Structured Query Language (SQL) statements, the computer software comprising instructions to cause a computer system to perform the following functions: receive a SQL statement having search criteria; create a table that lists all possible combinations of the search criteria; identify a set of patterns among the all possible combinations, and sort the table based on the set of patterns; divide the table into a set of temporary tables based on the set of patterns; join the set of temporary tables with the SQL statement, and generate a new set of temporary tables that contain results of searches conducted with the SQL statement as joined with the set of temporary tables; and combine the new set of temporary tables into a single result table.

Therefore, the present invention provides a method, system and program product for rewriting Structured Query Language (SQL) statements.

BRIEF DESCRIPTION OF THE DRAWINGS

These and other features of this invention will be more readily understood from the following detailed description of the various aspects of the invention taken in conjunction with the accompanying drawings in which.

Figure 1:
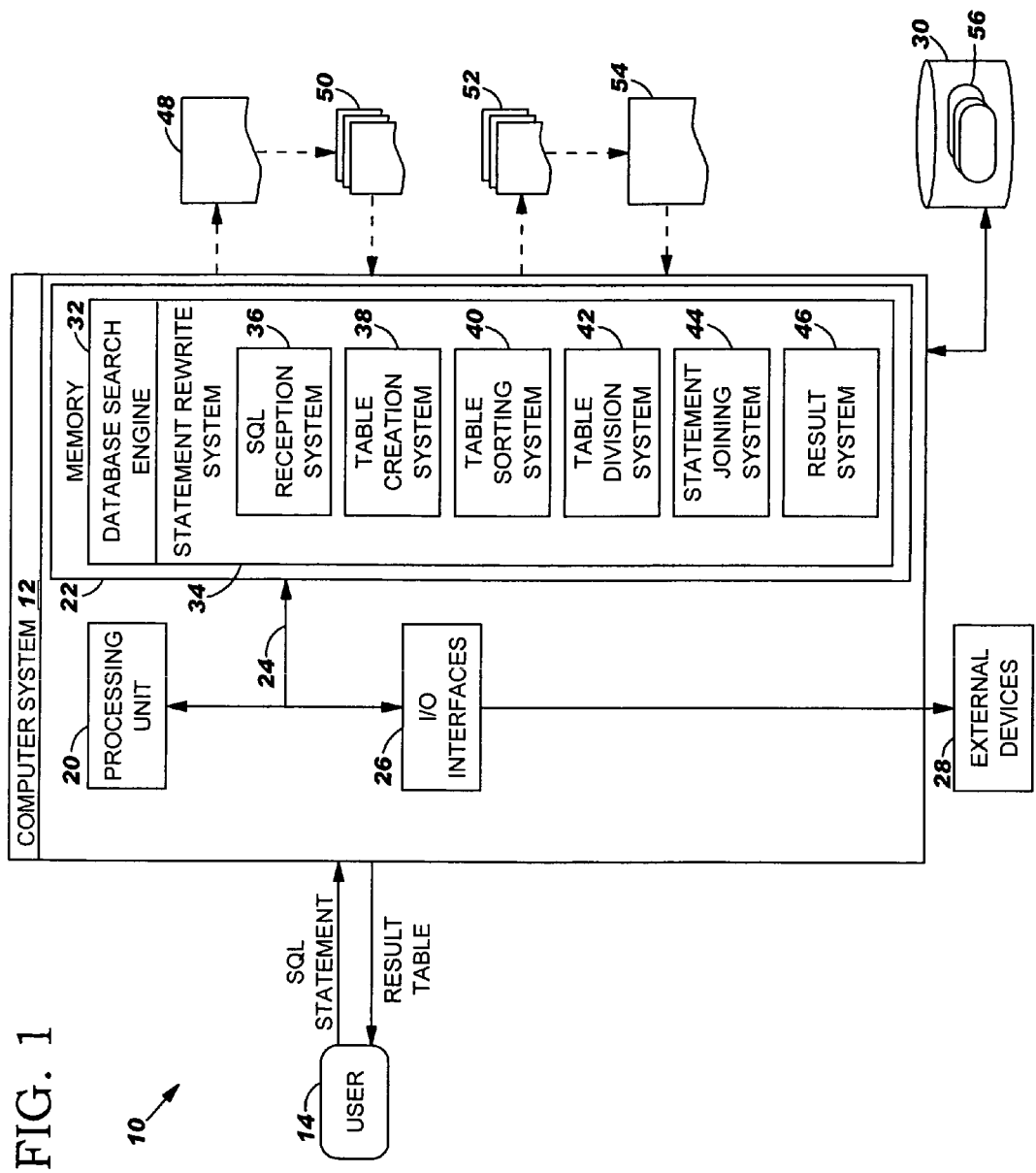
FIG. 1 depicts a system for rewriting Structured Query Language (SQL) statements according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system and program product for rewriting SQL statements. Under the present invention, a SQL statement having search criteria is received. Upon receipt, a table that lists all possible combinations of the search criteria is created. From the table, a set of patterns among the possible combinations is identified. Based on these patterns, the table is then sorted. Once sorted, the table is divided into a set of temporary tables based on the set of patterns/sorting operation. The set of temporary tables are then individually joined with the SQL statement and separate searches are conducted. A new set of temporary tables is then generated and populated with results of the separate searches. These result tables are then unioned/combined into a single result table.

Referring now to FIG. 1, an illustrative system 10 for rewriting SQL statements according to the present invention is shown. As depicted, system 10 includes computer system 12, which is intended to represent any type of computer system capable of carrying out the teachings of the present invention. For example, computer system 12 can be a desktop computer, a laptop computer, a workstation, a handheld device, a client, a server, etc. In any event, the teachings of the present invention can be implemented via a stand-alone system as shown, or over a network such as the Internet, a local area network (LAN), a wide area network (WAN), a virtual private network (VPN), etc. In the case of the latter, communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As further shown, computer system 12 generally includes processing unit 20, memory 22, bus 24, input/output (I/O) interfaces 26, external devices/resources 28 and database 30. Processing unit 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to processing unit 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Database 30 can be any type of database capable of providing storage for information (e.g., data objects 56, etc.) under the present invention. As such, database 30 could include one or more storage devices, such as a magnetic disk drive or an optical disk drive. In another embodiment, database 30 includes data distributed across, for example, a local area network (LAN), wide area network (WAN) or a storage area network (SAN) (not shown). Although not shown, additional components, such as cache memory, communication systems, system software, etc., may be incorporated into computer system 12.

Shown in memory 22 of computer system 12 as one or more program products is database search engine 32 and statement rewrite system 34. Database search engine 32 can be any type of search engine/system now known or later developed that is used to search/query databases and the like. To this extent, database search engine 32 is able to handle SQL statements from a user 14, and locate specific data objects 56 based thereon. Under the present invention, database search engine 32 is augmented by statement rewrite system 34, which can exist as part of database search engine 32 or it can be provided as a separate component that works in conjunction with database search engine 32 (e.g., a plug-in). As will be explained in greater detail below, statement rewrite system 34 "rewrites" SQL statements received from user 14 so that any search expressions (e.g., AND, OR, etc.) contained therein will not unduly slow the search process. Specifically, as mentioned above, SQL statements that contain search expressions such as AND and OR require significant more time to process than other SQL statements. The present invention rewrites such statements in a way that considerable processing time is saved.

Assume in an illustrative example that user 14 wishes to locate purchase orders having a certain "Country Code" and/or certain "Customer Number." In this case, user 14 will prepare and submit an SQL statement requesting such information. In general, an SQL statement includes certain search criteria. The search criteria typically include one or more search objects and one or more search expressions. In this illustrative example, "Country Code," and "Customer Number" would be considered the search objects. Depending on how user 14 constructs the SQL statement, typical search expressions could include the logical/Boolean operators of AND, OR, etc. In any event, listed below is an illustrative SQL statement for this example:

```
SELECT O.customer_po_num
FROM bse_order O INNER JOIN cust_order C ON (O.ID = c.order_id and
c.order_cust_type = 'SOLD_TO')
WHERE (O.ISO_COUNTRY_CODE IN ('DE') AND
C.CUSTOMER_NUM IN
('0000000010','0000041886','0000198815'))
OR (C.CUSTOMER_NUM IN
('0000847203','0000075949','0000556048','0000149090','0000847307',
'0000848084','0000858628','0000863555','0000123456','0000160970',
'0000160975','0000160978','0000199664','0000026569', '0000020177',
'0000020178'))
OR (O.ISO_COUNTRY_CODE IN ('GT') AND C.CUSTOMER_NUM IN
('0000052730'))
OR (O.ISO_COUNTRY_CODE IN ('CA')
    AND C.CUSTOMER_NUM IN
('0000083916','0000220837','0000347410','0000462909','0000508568',
     '0000633641','0000754760','0000765500'))
ORDER BY O.CUSTOMER_PO_NUM ASC FETCH FIRST
10000 ROWS ONLY;
```

In this SQL statement, user 14 is seeking purchase orders 56 under four different conditions:

(1) Purchase orders 56 having a "Country Code" of "DE" AND one of the customer numbers of '0000000010', '0000041886', '0000198815'; OR (2) Purchase orders 56 having one of the customer numbers of '0000847203', '0000075949', '0000556048', '0000149090', '0000847307', '0000848084', '0000858628', '0000863555', '0000123456', '0000160970', '0000160975', '0000160978', '00001 99664', '0000026569', '0000020177', '0000020178'; OR (3) Purchase orders 56 having a "Country Code" of "GT" AND a customer number of '0000052730'; OR (4) Purchase orders 56 having a "Country Code" of "CA" AND one of the customer numbers of '0000083916', '0000220837', '0000347410', '0000462909', '0000508568', '0000633641', '0000754760', '0000765500.'

As can thus be seen, the above SQL statement has several instances of search expressions (e.g., AND and OR). Under the present invention, statement rewrite system 34 will rewrite this SQL statement into smaller components that can be more efficiently handled by database search engine 32. That is, the present invention will rewrite the SQL statement such that it can be handled as a set of indices.

To this extent, when user 14 submits the SQL statement, it will be received by SQL reception system 36. Upon receipt, table creation system 38 will analyze the statement and create a table 48 that lists all of the possible combinations of the search criteria. Specifically, table 48 will list the various combinations of "Country Codes" and "Customer Numbers" that are contained within the SQL statement. An example of the table listing is shown below:

| C.CUSTOMER NUM | O.ISO COUNTRY CODE |
|---|---|
| '0000000010' | 'DE' |
| '0000041886' | 'DE' |
| '0000198815' | 'DE' |
| '0000847203' | — |
| '0000075949' | — |
| '0000556048' | — |
| '0000149090' | — |
| '0000847307' | — |
| '0000848084' | — |
| '0000858628' | — |
| '0000863555' | — |
| '0000123456' | — |

-continued

| C.CUSTOMER NUM | O.ISO COUNTRY CODE |
|---|---|
| '0000160970' | — |
| '0000160975' | — |
| '0000160978' | — |
| '0000199664' | — |
| '0000026569' | — |
| '0000020177' | — |
| '0000020178' | — |
| '0000052730' | 'GT' |
| '0000083916' | 'CA' |
| '0000220837' | 'CA' |
| '0000347410' | 'CA' |
| '0000462909' | 'CA' |
| '0000508568' | 'CA' |
| '0000633641' | 'CA' |
| '0000754760' | 'CA' |
| '0000765500' | 'CA' |

Once table 48 has been created, table sorting system 40 will identify a set (e.g., one or more) of patterns among the possible combinations, and sort the table based thereon. In viewing the content of table 48 as listed above, table sorting system 40 could identify two patterns for this illustrative example. Namely, (1) value and dash (e.g., "Customer Number" without "Country Code"); and (2) value and value (e.g., "Customer Number" with "Country Code"). After sorting table 48 based on these two patterns, table 48 will appear as follows:

| C.CUSTOMER NUM | O.ISO COUNTRY CODE |
|---|---|
| '0000020177' | — |
| '0000020178' | — |
| '0000026569' | — |
| '0000075949' | — |
| '0000123456' | — |
| '0000149090' | — |
| '0000160970' | — |
| '0000160975' | — |
| '0000160978' | — |
| '0000199664' | — |
| '0000556048' | — |
| '0000847203' | — |
| '0000847307' | — |
| '0000848084' | — |
| '0000858628' | — |
| '0000863555' | — |
| '0000083916' | 'CA' |
| '0000220837' | 'CA' |
| '0000347410' | 'CA' |
| '0000462909' | 'CA' |
| '0000508568' | 'CA' |
| '0000633641' | 'CA' |
| '0000754760' | 'CA' |
| '0000765500' | 'CA' |
| '0000000010' | 'DE' |
| '0000041886' | 'DE' |
| '0000198815' | 'DE' |
| '0000052730' | 'GT' |

Once table 48 has been sorted in this manner, table division system 42 will divide it into a set of temporary tables 50 based on the sorting/set of patterns. In this example, assume that table division system 42 divides table 48 into two temporary tables 50 (T1 and T2) based on the two patterns. T1 could be occupied by the value and dash entries ("Customer Number" with no "Country Code"), while T2 could be occupied by the value and value ("Customer Number" with "Country Code") entries of the sorted table 48 as follows:

```
WITH T1 (CUSTOMER_NUM) as (VALUES
('0000020177'),('0000020178'),('0000026569'),('0000075949'),
('0000123456'),('0000149090'), ('0000160970'),('0000160975'),
('0000160978'),('0000199664'),('0000556048'),('0000847203'),
('0000847307'),('0000848084'),('0000858628'),('0000863555')),
T2 (CUSTOMER_NUM, ISO_COUNTRY_CODE ) as (VALUES
('0000083916','CA'),('0000220837','CA'),('0000347410','CA'),
('0000462909','CA'),('0000508568','CA'),('0000633641','CA'),
('0000754760','CA'),('0000765500','CA'),('0000000010','DE'),
('0000041886','DE'),('0000198815','DE'),('0000052730','GT')),
```

Once these temporary tables 50 have been created, they will individually be joined with the original SQL statement by statement joining system 44, and processed by database search engine 32. That is, each temporary table will be individually joined to the original SQL statement and then passed to database search engine 32, which will conduct individual searches based thereon. The joining of tables T1 and T2 is accompanied with instructions to populate the results of the searches into a new set of temporary tables 52 (T3 and T4) by statement joining system 44, with T3 containing the results of T1 as joined with the SQL statement, and T4 containing the results of T2 as joined with the SQL statement. The following code is illustrative of these functions as enabled by statement joining system 44.

```
T3 (customer_po_num) as (
SELECT O.customer_po_num
FROM bse_order O INNER JOIN cust_order C ON (O.ID =
c.order_id and c.order_cust_type = 'SOLD_TO')
INNER JOIN t1 ON t1.CUSTOMER_NUM =
C.CUSTOMER_NUM),
T4 (customer_po_num) as (
SELECT O.customer_po_num
FROM bse_order O INNER JOIN cust_order C ON (O.ID =
c.order_id and c.order_cust_type = 'SOLD_TO')
INNER JOIN t2 ON t2.CUSTOMER_NUM =
C.CUSTOMER_NUM and
t2.ISO_COUNTRY_CODE = O.ISO_COUNTRY_CODE),
```

Figure 2:
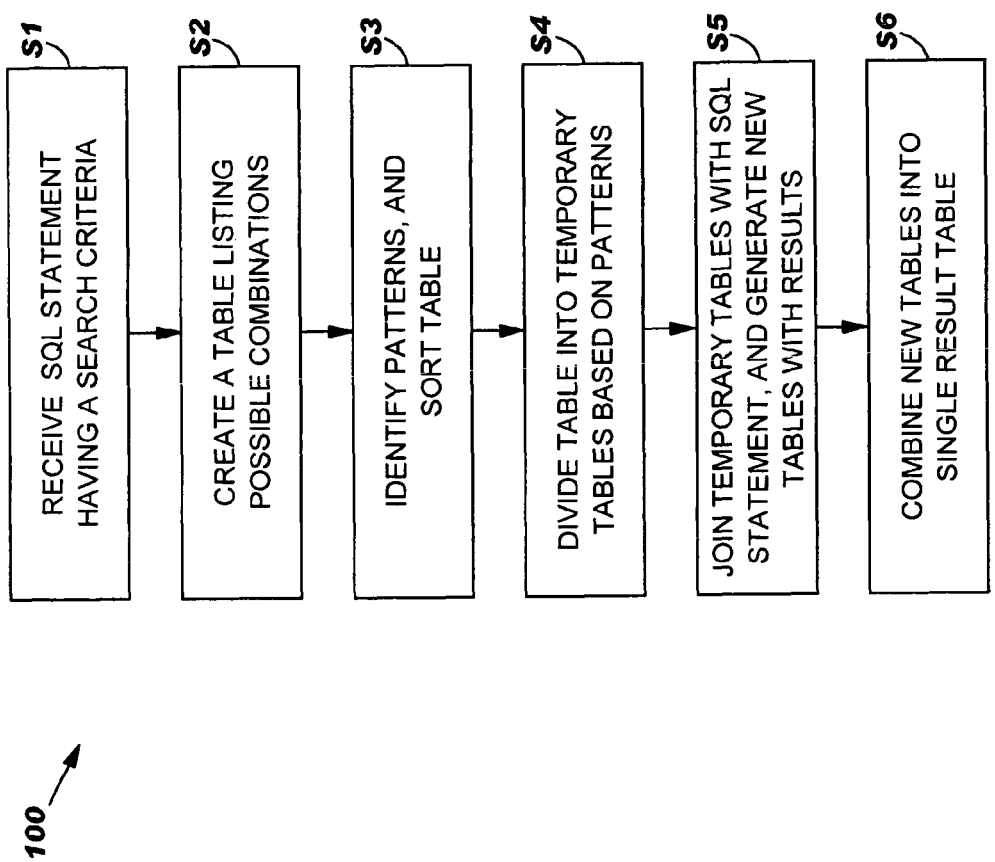
FIG. 2 depicts a method flow diagram according to the present invention.

Once the new set of temporary tables 52 have been generated (and populated), result system 46 will union/combine them into a single result table 54 (T5), which can be presented to user 14 who can then we use primary keys to find the rows to select from the original SQL tables, and add any other filters as follows:
select customer_po_num
from t5
ORDER BY O.CUSTOMER_PO_NUM ASC FETCH FIRST 10000 ROWS ONLY;

Referring now to FIG. 2, a method flow diagram 100 according to the present invention is shown. As depicted, first step S1 is to receive a SQL statement having search criteria. Second step S2 is to create a table that lists all possible combinations of the search criteria in the SQL statement. Third step S3 is to identify a set of patterns among the possible combinations, and to sort the table based thereon. Fourth step S4 is to divide the table into a set of temporary tables based on the set of patterns/sorting. Fifth step S5 is to join the set of temporary tables with the SQL statement, and generate a new set of temporary tables that contain results of searches conducted using the SQL statements as joined with the set of temporary tables. Sixth step S6 is to combine the new set of temporary tables into a single result table.

It should be appreciated that the present invention could be offered as a business method on a subscription or fee basis. For example, computer system 12 and/or statement rewrite system 34 could be created, supported, maintained and/or deployed by a service provider that offers the functions described herein for customers. That is, a service provider could offer to rewrite SQL statements for customers.

It should also be understood that the present invention could be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, statement rewrite system 34 is shown with a certain configuration of sub-systems for illustrative purposes only.

We claim:

1. A method for rewriting Structured Query Language (SQL) statements:
    receiving a SQL statement having search criteria that include conditions that pertain to a plurality of fields in a plurality of database tables;
    creating a table from the SQL statement that lists all possible combinations of the search criteria in the SQL statement, every combination reflecting a subset of information used to determine combined results;
    identifying a set of patterns among the all possible combinations of the SQL statement based on the fields referenced in the combinations, and sorting the table based on the set of patterns;
    dividing the table into a set of temporary tables based on the sorting;
    joining the set of temporary tables with the SQL statement, and generating a new set of temporary tables, each table consisting of results of a search conducted using a separate portion of the SQL statement as joined with the set of temporary tables; and
    combining all results from the new set of temporary tables into a single result table.

2. The method of claim 1, wherein the search criteria comprise a plurality of search objects joined by at least one search expression.

3. The method of claim 2, wherein the at least one search expression comprises a Boolean search expression.

4. The method of claim 1, wherein the joining step comprises individually joining each of the set of temporary tables with the SQL statement, and wherein the generating step comprises generating a single new temporary table for each single temporary table joined with the SQL statement.

5. The method of claim 4, wherein the joining comprises an inner join.

6. The method of claim 1, wherein the dividing step comprises dividing the table into a temporary table for each of the set of patterns that is identified.

7. The method of claim 6, wherein the dividing step rewrites the SQL statement as separate indices.

8. The method of claim 1, further comprising searching the final result table.

9. A system for rewriting Structured Query Language (SQL) statements, comprising:
   a processor; and
   a memory, the memory having:
      a system for receiving a SQL statement having search criteria that include conditions that pertain to a plurality of fields in a plurality of database tables;
      a system for creating a table from the SQL statement that lists all possible combinations of the search criteria in the SQL statement, every combination reflecting a subset of information used to determine combined results;
      a system for identifying a set of patterns among the all possible combinations of the SQL statement based on the fields referenced in the combinations, and sorting the table based on the set of patterns;
      a system for dividing the table into a set of temporary tables based on the set of patterns;
      a system for joining the set of temporary tables with the SQL statement, and generating a new set of temporary tables, each table containing results of a search conducted using a separate portion of the SQL statement as joined with the set of temporary tables; and
      a system for combining all results from the new set of temporary tables into a single result table.

10. The system of claim 9, wherein the search criteria comprise a plurality of search objects joined by at least one search expression.

11. The system of claim 10, wherein the at least one search expression comprises a Boolean search expression.

12. The system of claim 9, wherein the system for joining individually joins each of the set of temporary tables with the SQL statement, and wherein the system for generating generates a single new temporary table for each single temporary table joined with the SQL statement.

13. The system of claim 12, wherein the join comprises an inner join.

14. The system of claim 9, wherein the system for dividing divides the table into a temporary table for each of the set of patterns that is identified.

15. The system of claim 14, wherein the system for dividing rewrites the SQL statement as separate indices.

16. A computer system having program product stored thereon for rewriting Structured Query Language (SQL) statements, which when executed, comprises:
   program code for receiving a SQL statement having search criteria that include conditions that pertain to a plurality of fields in a plurality of database tables;
   program code for creating a table from the SQL statement that lists all possible combinations of the search criteria in the SQL statement, every combination reflecting a subset of information used to determine combined results;
   program code for identifying a set of patterns among the all possible combinations of the SQL statement based on the fields referenced in the combinations, and sorting the table based on the set of patterns;
   program code for dividing the table into a set of temporary tables based on the set of patterns;
   program code for joining the set of temporary tables with the SQL statement, and generating a new set of temporary tables, each table containing results of a search conducted using a separate portion of the SQL statement as joined with the set of temporary tables; and
   program code for combining all results from the new set of temporary tables into a single result table.

17. The computer system of claim 16, wherein the search criteria comprise a plurality of search objects joined by at least one search expression.

18. The computer system of claim 17, wherein the at least one search expression comprises a Boolean search expression.

19. The computer system of claim 16, wherein the program code for joining individually joins each of the set of temporary tables with the SQL statement, and wherein the program code for generating generates a single new temporary table for each single temporary table joined with the SQL statement.

20. The computer system of claim 19, wherein the join comprises an inner join.

21. The computer system of claim 16, wherein the program code for dividing divides the table into a temporary table for each of the set of patterns that is identified.

22. The computer system of claim 21, wherein the program code for dividing rewrites the SQL statement as separate indices.

23. A method for deploying an application for rewriting Structured Query Language (SQL) statements, comprising: providing a computer infrastructure being operable to:
   receive a SQL statement having search criteria that include conditions that pertain to a plurality of fields in a plurality of database tables;
   create a table from the SQL statement that lists all possible combinations of the search criteria in the SQL statement, every combination reflecting a subset of information used to determine combined results;
   identify a set of patterns among the all possible combinations of the SQL statement based on the fields referenced in the combinations, and sorting the table based on the set of patterns;
   divide the table into a set of temporary tables based on the set of patterns;
   join the set of temporary tables with the SQL statement, and generating a new set of temporary tables, each table containing results of a search conducted using a separate portion of the SQL statement as joined with the set of temporary tables; and
   combine all results from the new set of temporary tables into a single result table.

24. Computer software embodied in a data storage medium for rewriting Structured Query Language (SQL) statements, the computer software comprising instructions to cause a processor of a computer system to perform the following functions:
   receive a SQL statement having search criteria;
   create a table from the SQL statement that lists all possible combinations of the search criteria in the SQL statement;

identify a set of patterns among the all possible combinations of the SQL statement, and sorting the table based on the set of patterns;

divide the table into a set of temporary tables based on the set of patterns;

join the set of temporary tables with the SQL statement, and generating a new set of temporary tables, each table containing results of a search conducted using a separate portion of the SQL statement as joined with the set of temporary tables; and combine all results from the new set of temporary tables into a single result table.

* * * * *